(12) United States Patent
Muthiah (10) Patent No.: US 10,908,844 B2
(45) Date of Patent: Feb. 2, 2021

(54) STORAGE SYSTEM AND METHOD FOR MEMORY BACKLOG HINTING FOR VARIABLE CAPACITY

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/444,461

(22) Filed: Jun. 18, 2019

(65) Prior Publication Data
US 2020/0401341 A1 Dec. 24, 2020

(51) Int. Cl.
*G06F 3/06* (2006.01)
*G06F 12/02* (2006.01)

(52) U.S. Cl.
CPC ........... *G06F 3/0659* (2013.01); *G06F 3/061* (2013.01); *G06F 3/0658* (2013.01); *G06F 3/0683* (2013.01); *G06F 12/0253* (2013.01); *G06F 2212/7204* (2013.01)

(58) Field of Classification Search
CPC .... G06F 3/0659; G06F 3/0658; G06F 3/0683; G06F 3/061; G06F 12/0253; G06F 2212/7204
See application file for complete search history.

(56) References Cited

U.S. PATENT DOCUMENTS

| | | | |
|---|---|---|---|
| 9,135,190 B1 | 9/2015 | Bruce et al. | |
| 9,977,628 B2 | 5/2018 | Kochar et al. | |
| 2008/0250220 A1 | 10/2008 | Ito | |
| 2009/0077410 A1 | 3/2009 | Lin et al. | |
| 2009/0077436 A1 | 3/2009 | Lo et al. | |
| 2009/0276570 A1 | 11/2009 | Cheng et al. | |
| 2011/0167186 A1 | 7/2011 | Elhamias et al. | |
| 2012/0005404 A1 | 1/2012 | Raz et al. | |
| 2013/0138870 A1* | 5/2013 | Yoon | G11C 16/3495 711/103 |
| 2018/0081594 A1 | 3/2018 | Jung et al. | |

OTHER PUBLICATIONS

International Search Report and Written Opinion in Application No. PCT/US2019/067398, dated Apr. 23, 2020, 8 pages.

* cited by examiner

*Primary Examiner* — Kalpit Parikh
(74) *Attorney, Agent, or Firm* — Brinks Gilson & Lione (57) ABSTRACT

A storage system and method for memory backlog hinting for variable capacity are provided. In one embodiment, a method for memory backlog hinting for variable capacity is provided that is performed in a storage system comprising a memory. The method comprises: sending information regarding a state of the memory to a host device; receiving an instruction from the host device to alter memory capacity in order to alter memory performance, wherein the instruction is based on the information regarding the state of the memory sent to the host device; and altering memory capacity in order to alter memory performance in response to receiving the instruction from the host device. Other embodiments are provided.

20 Claims, 6 Drawing Sheets

STORAGE SYSTEM AND METHOD FOR MEMORY BACKLOG HINTING FOR VARIABLE CAPACITY

BACKGROUND

Manufacturers market storage systems with various characteristics, such as capacity and performance. In some environments, a host device can request that a storage system trade off some capacity to meet a performance requirement. However, there is no guarantee that the storage system can satisfy such a request. In some systems, such as Flexible Flash File Systems, predetermined single level cells (SLC) and multi-level cells (MLC) can be changed dynamically by the storage system to change the capacity-performance tradeoff. To do this, the storage system can use complex firmware to internally manage these heterogeneous memory regions with a data migration policy to attempt to meet the host's request for a desired capacity.

DETAILED DESCRIPTION

Overview

By way of introduction, the below embodiments relate to a storage system and method for memory backlog hinting for variable capacity. In one embodiment, a method for memory backlog hinting for variable capacity is provided that is performed in a storage system comprising a memory. The method comprises: sending information regarding a state of the memory to a host device; receiving an instruction from the host device to alter memory capacity in order to alter memory performance, wherein the instruction is based on the information regarding the state of the memory sent to the host device; and altering memory capacity in order to alter memory performance in response to receiving the instruction from the host device.

In some embodiments, the information regarding the state of the memory comprises one or more of the following: a number of free blocks in the memory, a number of used blocks in the memory, a number of single level cell (SLC) blocks in the memory, a number of triple level cell (TLC) blocks in the memory, a garbage collection workload, and backlog information.

In some embodiments, the method further comprises sending one or more of the following secondary information to the host device: memory age, memory quality, and memory endurance, wherein the instruction from the host device is also based on the secondary information.

In some embodiments, the method further comprises sending updated information about an updated state of the memory to the host device that indicates that it is no longer possible to reduce memory capacity in order to increase memory performance.

In some embodiments, the updated state indicates one or more of the following: urgent compaction, a wear level operation pending for longer than a threshold amount of time, and an urgent read scrub command.

In some embodiments, the method further comprises periodically sending updated information about the state of the memory to the host device.

In another embodiment, a storage system is provided comprising a memory and a controller configured to be in communication with the memory. The controller is further configured to: provide a hint to a host device on a condition of the memory; receive a command from the host device to alter memory capacity in order to alter memory performance, wherein the command is in response to the hint provided to the host device; and alter memory capacity in order to alter memory performance in response to receiving the command from the host device.

In some embodiments, the information regarding the state of the memory comprises one or more of the following: a number of free blocks in the memory, a number of used blocks in the memory, a number of single level cell (SLC) blocks in the memory, a number of triple level cell (TLC) blocks in the memory, a garbage collection workload, and backlog information.

In some embodiments, the controller is further configured to send one or more of the following secondary hints to the host device: memory age, memory quality, and memory endurance, wherein the command from the host device is also in response to the secondary information.

In some embodiments, the controller is further configured to send an updated hint to the host device that indicates that it is no longer possible to reduce memory capacity in order to increase memory performance.

In some embodiments, the updated hint indicates one or more of the following: urgent compaction, a wear level operation pending for longer than a threshold amount of time, and an urgent read scrub command.

In some embodiments, the controller is further configured to periodically send updated hints about the state of the memory to the host device.

In some embodiments, the memory comprises a three-dimensional memory.

In some embodiments, the storage system is configured to be integrated in the host device.

In some embodiments, the storage system is configured to be removably connected with the host device.

In another embodiment, a storage system is provided comprising: a memory; means for sending information regarding a state of the memory to a host device; means for receiving an instruction from the host device to alter memory capacity in order to alter memory performance, wherein the instruction is based on the information regarding the state of the memory sent to the host device; and means for altering memory capacity in order to alter memory performance in response to receiving the instruction from the host device.

In some embodiments, the information regarding the state of the memory comprises one or more of the following: a number of free blocks in the memory, a number of used blocks in the memory, a number of single level cell (SLC) blocks in the memory, a number of triple level cell (TLC) blocks in the memory, a garbage collection workload, and backlog information.

In some embodiments, the storage system further comprises means for sending one or more of the following secondary information to the host device: memory age, memory quality, and memory endurance, wherein the instruction from the host device is also based on the secondary information.

In some embodiments, the storage system further comprises means for sending updated information about an updated state of the memory to the host device that indicates that it is no longer possible to reduce memory capacity in order to increase memory performance.

In some embodiments, the storage system further comprises means for periodically sending updated information about the state of the memory to the host device.

Other embodiments are possible, and each of the embodiments can be used alone or together in combination. Accordingly, various embodiments will now be described with reference to the attached drawings.

Embodiments

Figures 1A, 1B:
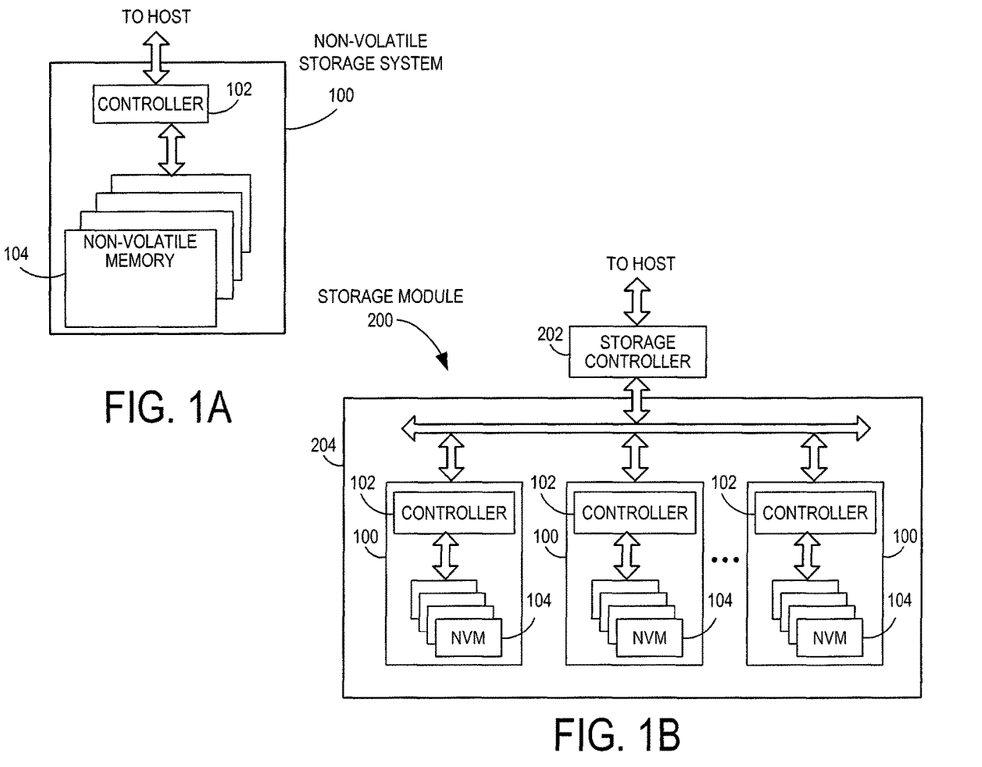
FIG. 1A is a block diagram of a non-volatile storage system of an embodiment.
FIG. 1B is a block diagram illustrating a storage module of an embodiment.
Figure 1C:
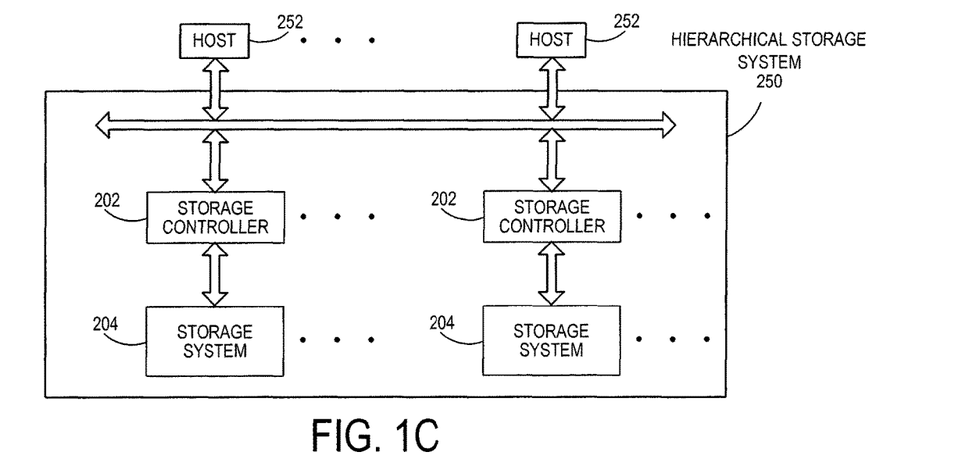
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
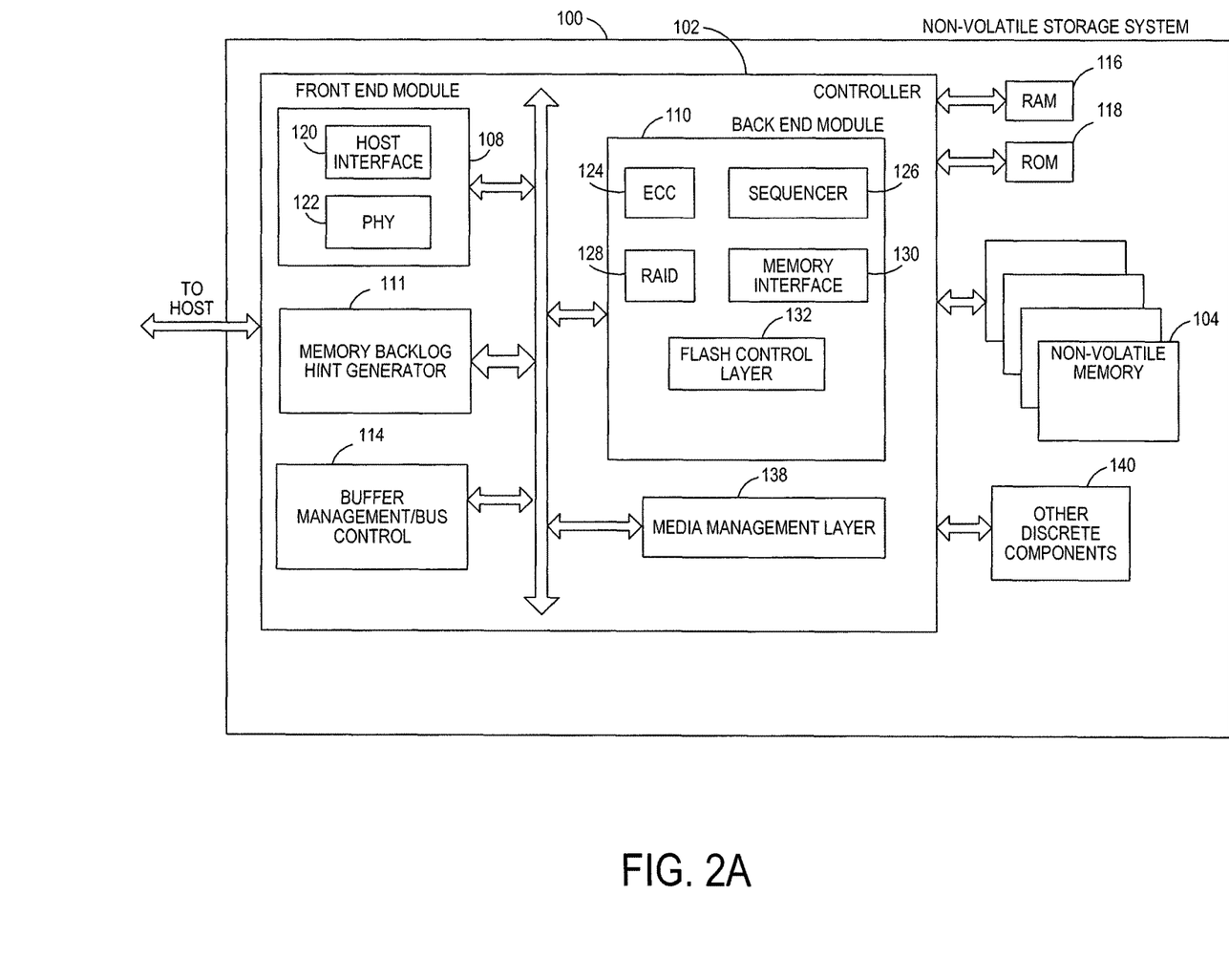
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a memory backlog hint generator 111, which is discussed in more detail below, and can be implemented in hardware or software/firmware. The memory backlog hint generator 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
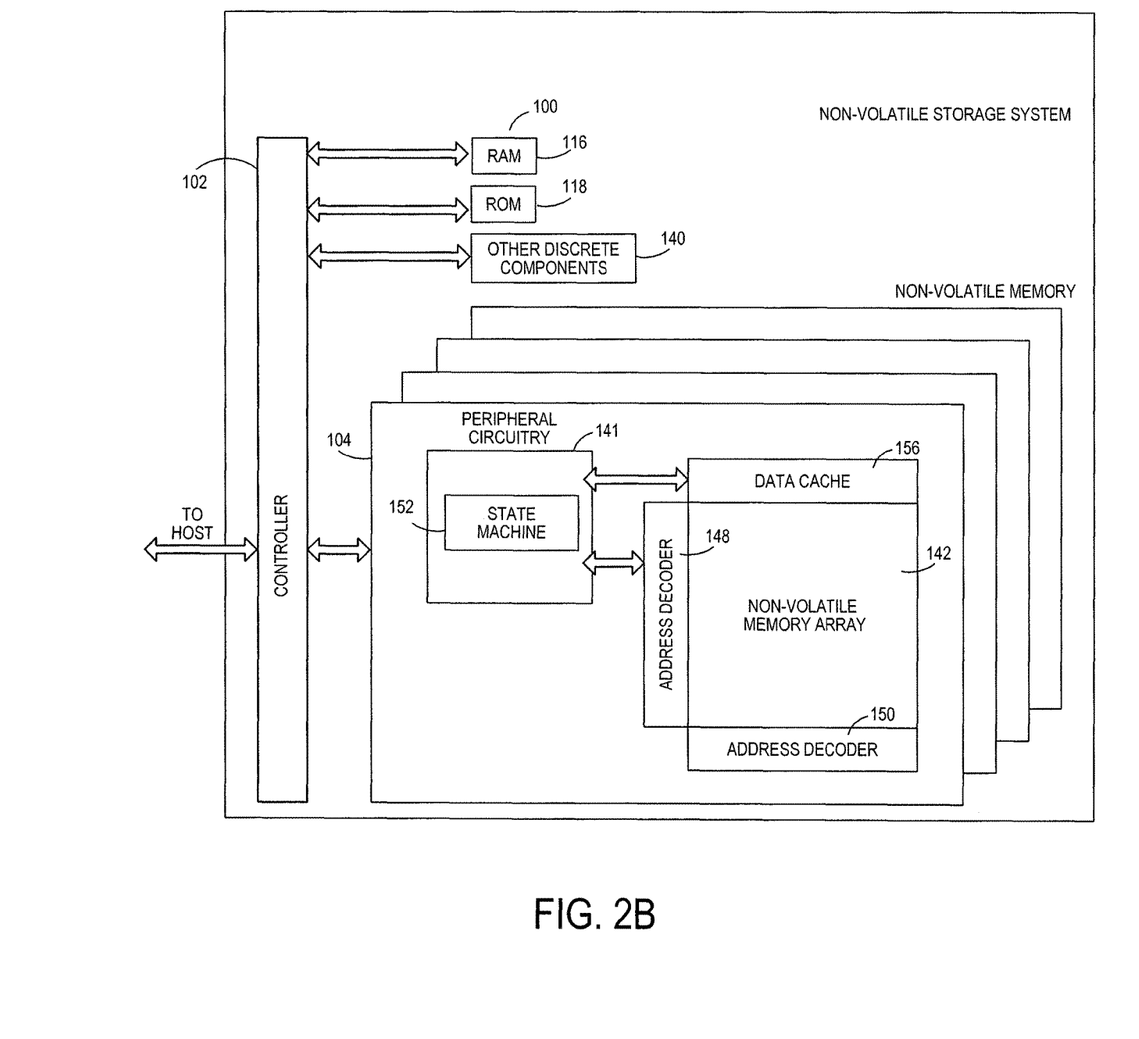
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

In one embodiment, the memory 104 comprises memory cells that can be configured either as single level cells (SLC) or as multi-level cells (MLC), and that configuration can change when the storage system 100 in the field (i.e., after manufacturing). The configuration of some or all of the memory 104 as either SLC or MLC affects both the capacity of the memory 104 and the performance of the storage system 100. More specifically, MLC cells can store more data than SLC cells; however, it takes longer to program an MLC cell than an SLC cell, resulting in slower performance. For example, to store extra bits of data in an MLC cell, the MLC cell may need four units of charge on the floating gate in the memory cell during the same voltage programming window that an SLC uses. To do this, the MLC cell may require a more time-consuming programming algorithm, which makes programming an MLC cell up to four times slower than programming an SLC cell. Additionally, unlike an SLC cell, a MLC cell may not support copyback or partial programming, which also reduces system performance.

As mentioned above, manufacturers market storage systems with various characteristics, such as capacity and performance. Sometimes, the host device may be willing to trade off some capacity (e.g., using SLC cells instead of MLC cells, or foregoing garbage collection to free-up blocks of memory) to meet an urgent performance requirement. To do this, the host device can send a request to the storage system to alter the configuration of its memory cells. However, the host device does not know the internal details of the memory. Without this information, the host device makes a blind request assuming that the memory would be able to meet it. However, the memory may or may not be able to meet such a requirement, and the host device stands the chance of not being able to leverage the capacity of the memory in the desired way. Hence, there is no guarantee that even if a special request is made by the host device, it will be fulfilled by the memory. To address this problem, in some systems, such as Flexible Flash File Systems, predetermined single level cells (SLC) and multi-level cells (MLC) can be changed dynamically. The storage system internally manages heterogeneous memories regions and uses complex firmware with data migration policy as it tries to make sure the capacity is intact. However, the complexity of the firmware can be disadvantageous.

Figure 3:
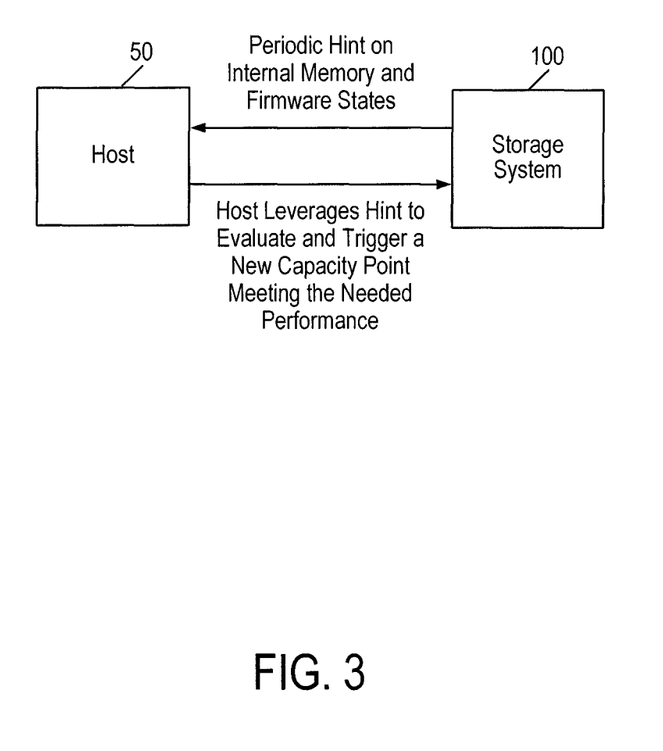
FIG. 3 is a block diagram of a storage system and host of an embodiment for memory backlog hinting for variable capacity.

The following embodiments can be used to address these issues. Turning again to the drawings, FIG. 3 is a block diagram of a host 50 and storage system 100 of an embodiment. As shown in this drawing, in this embodiment, the storage system 100 provides a "hint" on the storage system's internal memory 104 and firmware states (e.g., via an acknowledgement channel specified by a protocol addendum). To support this functionality, the controller 102 (e.g., firmware) in the storage system 100 can be configured to realize its current memory state in terms of garbage collection handling, memory quality, and wear-levelling requirements to periodically make estimates on the workload.

The host 50 leverages this hint to evaluate and trigger a new capacity point that meets a needed performance requirement. Because of this interaction, the host 50 can dynamically influence the storage system 100 towards varying memory capacity to meet a performance requirement by sending a command or instruction (e.g., an administrative command) to the storage system 100 to reduce memory capacity in order to increase memory performance. In response to this instruction/command, the storage system 100 can make the relevant changes to memory operation to affect this change. For example, the controller 102 in the storage system 100 can configured some or all of the memory 104 as SLC cells instead of MLC cell, can forego or reduce garbage collection, etc.

With these embodiments, the storage system's controller 102 (e.g., the hint generator 111) can gather information that affects memory performance and generate a "hint" to provide an indication of backlog to the host 50 to enable the host 50 to make a better decision, if appropriate. This results in a simpler and more affordable storage system than the one mentioned above that use complex firmware. Further, with these embodiments, the host 50 does not have to speculate on performance or capacity. The host 50 can use the hint to figure out the available capacity for a given performance requirement. That is, since only the storage system 100 is aware of its underlying memory resources and workload, a hint provided by the storage system 100 to the host 50 can be leveraged by the host to make a fair estimate of the amount of time it can make the memory 104 work at a particular performance mode. As another advantage, these embodiments can provide variable capacity of the memory 104 to provide a better guarantee for burst performance even towards the end of the life of the memory 104.

As indicated in FIG. 3, the hint can be updated periodically. That way, if the state of the memory 104 changes over time, the storage system 100 can generate an updated hint to the host 50, so that it can tune the capacity/performance tradeoff and mapping. In this way, the host 50 can opt to continue a certain capacity for a long duration with periodic hints. Additionally, if the host 50 is connected to a plurality of storage systems that have the ability to generate and provide hints, the host 50 can make a consolidated call to map its requirement to the relevant storage system.

The "hint" can take any suitable form. For example, in one embodiment, the hint (or, more generally, "information regarding the state of the memory," can take the form of one or more of the following: a number of free blocks in the memory 104, a number of used blocks in the memory 104, a number of single level cell (SLC) blocks in the memory 104, a number of multi-level cell (MLC) blocks in the memory 104, a garbage collection workload, and backlog information (e.g., due to a previous burst mode request). As such, the hint/information will sometimes be described herein as a memory backlog hint and/or workload hint.

As other memory parameters can play a role in absolute latency in moving blocks (e.g., due to different trim parameters), information about those other parameters can be sent to the host 50 as well for use in its decision. Examples of such secondary information can include, but are not limited to, memory age, memory quality, and memory endurance. When such secondary information is sent to the host 50, the host 50 can base its capacity/performance decision both on the state of the memory 104 and on the secondary information.

It should be noted that it is not always practically possible for the host 50 to make the memory 104 work on a performance mode for a stipulated time without compromising the capacity point; at least it may not be guaranteed for long. The capacity of the memory 104 varies at various points as and when the host 50 makes a new mode request based on a hint from the storage system 100. As such, the capacity is dynamically defined and varied by the host 50. Once that mode is no longer possible (e.g., due to internal obligations, such as urgent compaction, wear leveling pending for longer than a threshold amount of time, long or urgent read scrubs, etc.), the storage system 100 can send an updated hint/information to the host 50 (if the host 50 has not already changed the mode based on its fair estimate). The host 50 can request a different capacity point (e.g., mapping to a lower performance mode) based on the new information of the memory's operating limit. The storage system 100 can send the updated information periodically, as a change happens, or at some other time interval.

Figure 4:
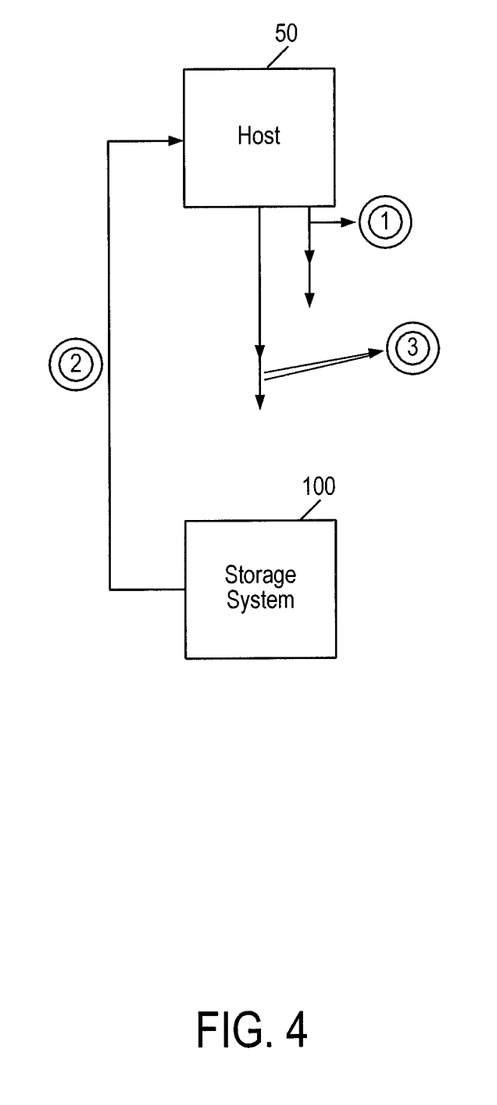
FIG. 4 is a diagram illustrating a process flow of an embodiment.

Turning again to the drawings, the overall operation of the examples set forth above is shown in the flow diagram of FIG. 4. As shown in FIG. 4, first, the host 50 requests a performance mode (act 1). In one implementation, this is fixed per a requirement of a protocol being used. Next, the storage system 100 provides primary (and, optionally, secondary) hints to the host 50 (act 2). As mentioned above, the hints can be based on, for example, backlog work due to burst mode, garbage collection workload, and/or memory health). Based on this information, the host 50 can present a different capacity point to attempt to reach its desired performance requirement (act 3). In this example, acts 2 and 3 involve periodically-changing variables according to the requested performance in act 1. Further, the state machine/generator 111 in the storage system 100 that generates the hints continues until the host 50 or storages system 100 resets it, such as when the host 50 ignores a hint.

Figure 5:
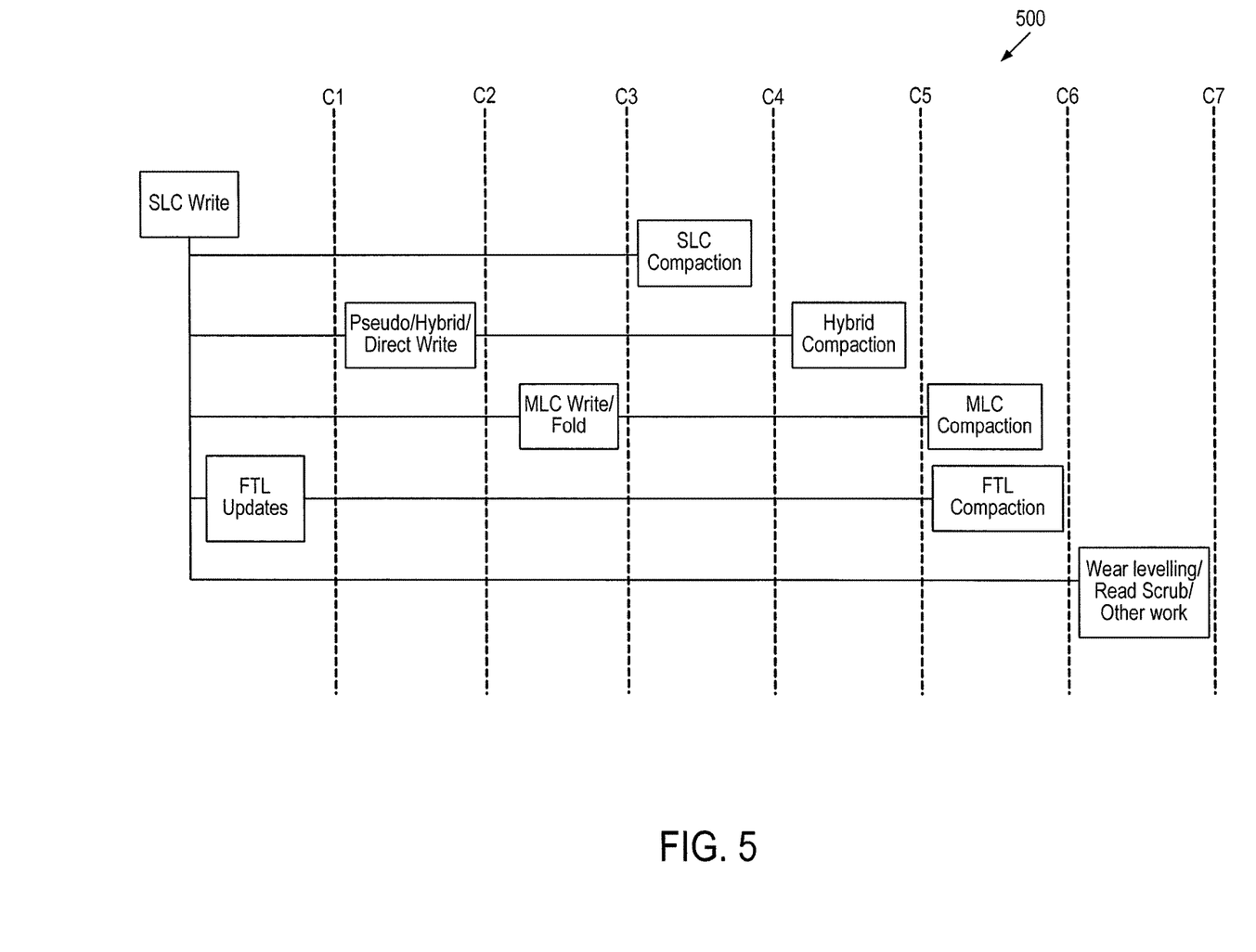
FIG. 5 is a diagram of an embodiment illustrating different performance modes.

Further, to help with performance when SLC cells are used, the storage system 100 can freeze some of its activities. This will be discussed in conjunction with FIG. 5. FIG. 5 shows a diagram 500 that illustrates various acts that are taking place in response to an SLC write operation. These acts include Flash Translation Layer (FTL) updates, pseudo/hybrid/direct write, MLC write/fold, SLC compaction, hybrid compaction, MLC compaction, FTL compaction, and wear leveling/read scrub/other work. Although not shown, balanced garbage collection can occur along with the writes. To increase performance even when SLC cells are used, the storage system 100 can freeze some of these activities. For example, for better performance, the storage system 100 can suspend garbage collection, wear levelling, and/or read scrub for some period of time.

In some cases, the host 50 may want a bumped-up performance for an amount of time for a given piece of data. The host 50 could have such a requirement for processing edge decisions for artificial intelligent or machine learning for certain high-end gaming applications. The host's performance requirement may be based on learning from those applications needing it. For example, if the host 50 is handling multiple applications, based on learning or just pure history, it may know the performance requirement for the applications under use. The host 50 can put to use the memory backlog hint (and, optionally, the second information), along with its own learning, to determine the performance and the capacity point for further use of storage system 100 at a given point of time for multiple such applications.

There are many other applications that can benefit from these embodiments. For example, as noted above, using these embodiments to leverage a larger capacity of a storage system can allow processing edge decisions fast enough for artificial intelligence/machine learning applications irrespective of the state of the memory 104. As another example, these embodiments can be used by Non-Volatile Memory Express (NVMe) devices to support multiple physical stores to make use of different media to provide different qualities of service for certain logical block addresses (LBAs)/namespaces.

The following paragraphs describe other example use cases. In one example use case, a retail storage system with one form factor can be used in various performance modes based on the memory backlog hint. For example, a 400 gigabyte (GB) Secure Digital (SD) card can be used in default mode and in a high-performance mode capable of 4K video recording through a host command that is based on a memory backlog hint from the SD card. By providing an interface channel to communicate the memory hint, these embodiments can be used to leverage a larger memory capacity, making sure that endurance and other factors are met per specification of the SD card.

In another use case, these embodiments are used to ensure that processing edge decisions are fast enough for artificial intelligence and machine learning. For example, when a machine learning application is utilizing the memory and needs a momentary performance burst, even it means at a cost of capacity, these embodiments can provide that without speculation on performance for that capacity. Further, as mentioned above, in the case of a storage pool, if the host has access to multiple storage systems, with backlog hints from each of them, the host can decisively decide the next correct course of action.

It should be noted that these embodiments provide extra performance without the need for dynamic overprovisioning of blocks of memory. The extra performance provided by these embodiments is achieved through lowering the capacity point itself of the memory. The lower capacity point can be brought back if the host requests by requesting a lower-than-average performance for subsequent commands. This is a win-win situation since there may not be a top performance gear requirement all the time. With the host having full control owing to backlog hinting, the host can work around multiple performance limitations through leveraging capacity and not through any overprovisioning of blocks.

There are several alternatives that can be used with these embodiments. For example, instead of reducing capacity for increased performance, these embodiments can be used to increase capacity for decreased performance. Accordingly, these embodiments can be said to alter capacity to alter performance.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for memory backlog hinting for variable capacity, the method comprising:
  performing the following in a storage system comprising a memory:
    sending information regarding a state of the memory to a host device;
    receiving an instruction from the host device to alter memory capacity to alter memory performance, wherein the instruction is based on the information regarding the state of the memory sent to the host device;
    altering memory capacity to alter memory performance in response to receiving the instruction from the host device, wherein the altered memory capacity is maintainable by the storage system for only a limited amount of time; and
    performing one of the following:
      receiving an instruction from the host device to cease altering memory capacity prior to an expiration of the limited amount of time, wherein the instruction to cease altering memory capacity is based on the host device's estimate of the limited amount of time; and
      in response to the instruction from the host device to cease altering memory capacity not being received prior to the expiration of the limited amount of time, informing the host device that the altered memory capacity is no longer maintainable by the storage system.

2. The method of claim 1, wherein the information regarding the state of the memory comprises one or more of the following: a number of free blocks in the memory, a number of used blocks in the memory, a number of single level cell (SLC) blocks in the memory, a number of multi-level cell (MLC) blocks in the memory, a garbage collection workload, and backlog information.

3. The method of claim 2, further comprising sending one or more of the following secondary information to the host device: memory age, memory quality, and memory endurance, wherein the instruction from the host device is also based on the secondary information.

4. The method of claim 1, further comprising sending updated information about an updated state of the memory to the host device.

5. The method of claim 4, wherein the updated state indicates one or more of the following: urgent compaction, a wear level operation pending for longer than a threshold amount of time, and an urgent read scrub command.

6. The method of claim 4, further comprising periodically sending the updated information to the host device.

7. A storage system comprising:
  a memory; and
  a controller configured to be in communication with the memory, wherein the controller is further configured to:
    provide a hint to a host device regarding a condition of the memory;
    receive a command from the host device to alter memory capacity to alter memory performance, wherein the command is in response to the hint provided to the host device;

alter memory capacity to alter memory performance in response to receiving the command from the host device, wherein the altered memory capacity is maintainable by the storage system for only a limited amount of time; and perform one of the following:
receive an instruction from the host device to cease altering memory capacity prior to an expiration of the limited amount of time, wherein the instruction to cease altering memory capacity is based on the host device's estimate of the limited amount of time; and in response to the instruction from the host device to cease altering memory capacity not being received prior to the expiration of the limited amount of time, inform the host device that the altered memory capacity is no longer maintainable by the storage system.

8. The storage system of claim 7, wherein the hint regarding the condition of the memory comprises one or more of the following: a number of free blocks in the memory, a number of used blocks in the memory, a number of single level cell (SLC) blocks in the memory, a number of multi-level cell (MLC) blocks in the memory, a garbage collection workload, and backlog information.

9. The storage system of claim 8, wherein the controller is further configured to send one or more of the following secondary hints to the host device: memory age, memory quality, and memory endurance, wherein the command from the host device is also in response to the secondary information.

10. The storage system of claim 7, wherein the controller is further configured to send an updated hint to the host device.

11. The storage system of claim 10, wherein the updated hint indicates one or more of the following: urgent compaction, a wear level operation pending for longer than a threshold amount of time, and an urgent read scrub command.

12. The storage system of claim 10, wherein the controller is further configured to periodically send the updated hint to the host device.

13. The storage system of claim 7, wherein the memory comprises a three-dimensional memory.

14. The storage system of claim 7, wherein the storage system is configured to be integrated in the host device.

15. The storage system of claim 7, wherein the storage system is configured to be removably connected with the host device.

16. A storage system comprising:

a memory;

means for sending information regarding a state of the memory to a host device;

means for receiving an instruction from the host device to alter memory capacity to alter memory performance, wherein the instruction is based on the information regarding the state of the memory sent to the host device;

means for altering memory capacity to alter memory performance in response to receiving the instruction from the host device, wherein the altered memory capacity is maintainable by the storage system for only a limited amount of time; and means for performing one of the following:
receiving an instruction from the host device to cease altering memory capacity prior to an expiration of the limited amount of time, wherein the instruction to cease altering memory capacity is based on the host device's estimate of the limited amount of time; and in response to the instruction from the host device to cease altering memory capacity not being received prior to the expiration of the limited amount of time, informing the host device that the altered memory capacity is no longer maintainable by the storage system.

17. The storage system of claim 16, wherein the information regarding the state of the memory comprises one or more of the following: a number of free blocks in the memory, a number of used blocks in the memory, a number of single level cell (SLC) blocks in the memory, a number of multi-level cell (MLC) blocks in the memory, a garbage collection workload, and backlog information.

18. The storage system of claim 17, further comprising means for sending one or more of the following secondary information to the host device: memory age, memory quality, and memory endurance, wherein the instruction from the host device is also based on the secondary information.

19. The storage system of claim 16, further comprising means for sending updated information about an updated state of the memory to the host device.

20. The storage system of claim 19, further comprising means for periodically sending the updated information to the host device.

* * * * *